Figure 1:
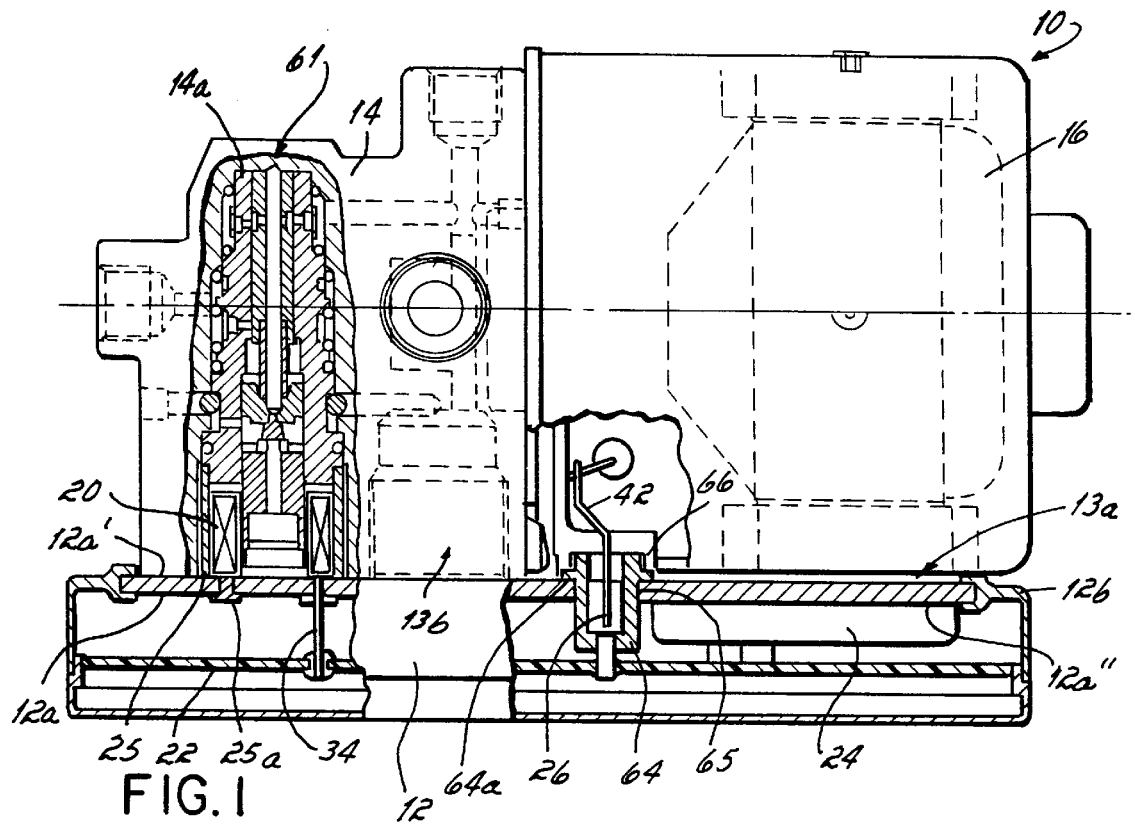

US005769508A

United States Patent [19]

Gilles et al.

[11] Patent Number: 5,769,508
[45] Date of Patent: Jun. 23, 1998

[54] HYDRAULIC POWER UNIT FOR A BLOCK-PROTECTED VEHICLE BRAKING SYSTEM

[75] Inventors: Leo Gilles, Koblenz; Helmut Gegalski, Mülheim-Kärlich, both of Germany

[73] Assignee: Lucas Industries public limited company, West Midlands, United Kingdom

[21] Appl. No.: 623,404

[22] Filed: Mar. 28, 1996

[30]   Foreign Application Priority Data

Apr. 5, 1995 [DE] Germany ........................ 195 12 804.4

[51] Int. Cl.⁶ ........................................................ B60T 8/40
[52] U.S. Cl. ..................................... 303/116.4; 303/119.1
[58] Field of Search ............................. 303/116.1, 116.4,
303/119.1, 119.2; 439/34, 544, 636; 335/202,
278, 260; 336/92, 172

[56]           References Cited

U.S. PATENT DOCUMENTS 5,022,717  6/1991  Heibel et al. ........................ 303/119.2
5,275,478  1/1994  Schmitt et al. ...................... 303/119.2
5,449,227  9/1995  Steinberg et al. ................... 303/119.2
5,452,948  9/1995  Cooper et al. ....................... 303/119.2
5,513,905  5/1996  Zeides et al. ........................ 303/119.2
5,520,447  5/1996  Burgdorf et al. .................... 303/119.2
5,520,546  5/1996  Kilinger et al. ................. 303/119.2 X

FOREIGN PATENT DOCUMENTS

0438553B1  7/1991  European Pat. Off. .
8815427.0  5/1990  Germany .
4100967A1  7/1992  Germany .

Primary Examiner—Lee W. Young
Attorney, Agent, or Firm—Wood, Herron & Evans, L.L.P.

[57]           ABSTRACT

The invention relates to a hydraulic power unit for a vehicle braking system comprising an electronic controller (22, 24) arranged in a housing (12), a valve block (14) for accommodating electromagnetic valves for the control of hydraulic fluid in the braking system, and a pump motor (16) for a pump delivering a hydraulic fluid, with the housing (12) of the controller (22, 24) being connected with the valve block (14) and the pump motor (16) and is characterized in that a wall (12a) of the housing (12) at its outer surface (12a') facing the valve block (14) carries at least one solenoid (20) for the electromagnetic valves in the valve block (14).

13 Claims, 2 Drawing Sheets

HYDRAULIC POWER UNIT FOR A BLOCK-PROTECTED VEHICLE BRAKING SYSTEM

DESCRIPTION

The invention relates to a block-protected braking system comprising an electronic controller arranged in a housing, a valve block for accommodating solenoid valves for the control of hydraulic fluid in the braking system, and a pump motor for a pump delivering a hydraulic fluid, with the housing of the controller being connected with the valve block and the pump motor.

The term "block-protected braking system" herein refers to a unit which prevents the blockage of braked wheels of a vehicle and, if required, also the spinning of driven wheels (so-called antislip control—ASC). Such a unit comprises at least the following assemblies: an electronic controller which generally includes a computer which derives instructions for the control of the braking system depending on measured data (such as e.g. deceleration and acceleration values of the wheels), a valve block which in particular accommodates solenoid valves for controlling the hydraulic fluid in the braking system, with the valves being opened or closed, respectively, in accordance with the instructions generated by the computer, and a pump motor which drives a pump which delivers the hydraulic fluid to the master cylinder and/or the wheel brakes of the vehicle, if the valves are set accordingly.

The system assemblies valve block, pump, and pump motor are often designated as the "hydraulic power unit".

The present invention relates to the arrangement, assembly and connection of the cooperating assemblies electronic controller, valve block, pump motor and pump.

From the state of the art a variety of arrangements of the mentioned assemblies of a block-protected braking system is known. Particular reference shall be made to EP-A-0 105 219, DE-A-38 13 138 and DE-A-38 13 139.

Figure 3:
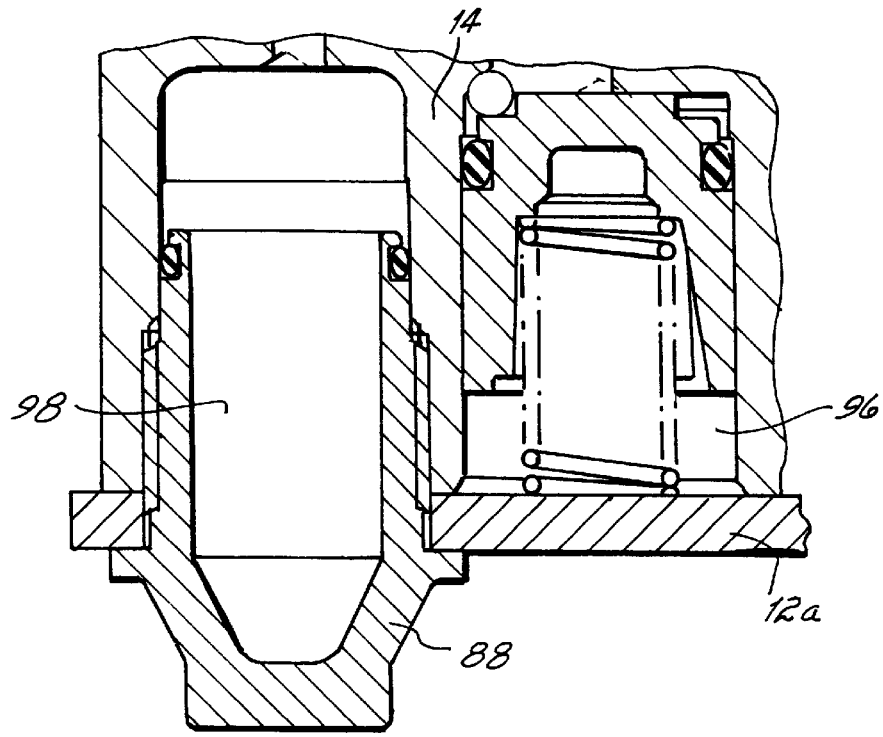
Figure 4:
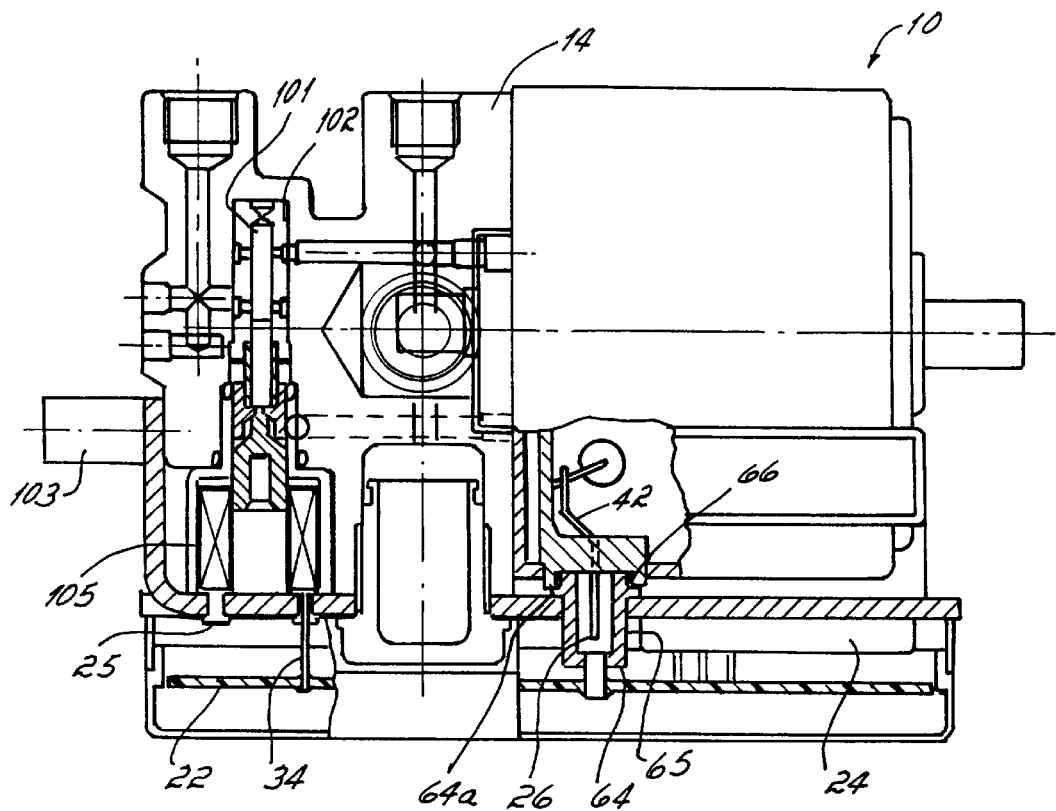

In the pressure control unit which is known from DE 88 15 427 U1, a hood is equipped with electronic components, and a plug plate is arranged within the hood which can be coupled to a valve block with plugs of solenoid valves. The solenoid valves form part of the valve block. The solenoid valves are either secured in the valve block by a plate (FIGS. 1, 2), or the solenoid valves are loosely accommodated in the valve block and secured in their position by installing the hood (FIGS. 3, 4). Here, the plug plate serves the sole purpose of making the electrical contact with the solenoid valves.

In the electrohydraulic pressure control apparatus which is known from DE 41 00 967 A1, the solenoids are either accommodated in the housing via supports, with the solenoids being secured at an intermediate wall in the housing, or the solenoids are secured at a support plate which can be engaged in the housing by means of a snap-action connection.

With respect to the geometrical arrangement of the above-mentioned components and their electrical and mechanical connections, it is of essential importance to achieve an assembly as compact (minimum space requirement) as possible. Moreover, lines for the electrical connections (in particular cable trees) are to be reduced with respect to circumference and length, and the assembly of the parts must be as simple as possible. In addition, the entire arrangement should be limited to as few components as possible. Moreover, the connection of the individual components shall be electrically and mechanically safe and have a low susceptibility to failures. The subject matter of the present invention implies an improvement with respect to all these technical problems.

In view of the above-mentioned set of technical objects, the electrical and mechanical assembly of the pump motor according to the state of the art need to be improved. It is also to be noted that under the aspect of the above-mentioned mechanical and, especially, electrical safety of assembly and connection of the components, a sealing of the housing which encompasses the components becomes necessary, especially a sealing against humidity, dirt, etc.

EP-A-0 438 553 discloses a valve block where the solenoids of the valves are combined on a common contact carrier which also contains common connectors for connecting the solenoids with the electronic controller of the braking system. However, an integration of the electrical and mechanical assembly of the pump motor is not provided.

In view of the technical problems as mentioned the invention improves a block-protected braking system of the above-mentioned type by the characteristics of claim 1.

Preferred embodiments of the block-protected braking system are described in the dependent claims.

Due to the embodiment according to the invention to have the solenoids for the electromagnetic valves in the valve block carried by a wall of the housing in its outer surface facing the valve block, this wall of the housing forms a support plate for the solenoids, with the solenoids together with the support plate forming a subassembly which can be handled independently. This is advantageous in that fewer individual components have to be joined during the assembly. Instead, preassembled components can be function and quality tested individually in order to be able to subsequently carry out the total assembly. Inspection or maintenance can be carried out very easily with the pre-assembled subassembly consisting of the housing wall with the solenoids secured thereon.

The solenoids for the electromagnetic valves are preferably joined with the wall of the housing by means of an electrically insulating material so that the wall of the housing and the solenoids—as well as the electrical connections for the solenoids, if required—form a complete potted unit.

The electrical connections of the solenoids penetrate the wall of the housing and are connected with the electronic controller arranged in the housing either directly or via connectors. If the wall of the housing is made from a material with high heat conductivity, an improvement of the heat elimination behaviour of dissipated heat from the interior of the housing of the electronic controller is achieved. This is of importance inasmuch as the electronic controller is normally arranged in the engine compartment of the motor vehicle, in parts of which high temperatures are prevailing. Moreover, this design makes it possible to omit the separately formed heat sinks, which contributes to a miniaturisation and weight reduction of the total arrangement.

The wall of the housing at its inner surface facing away from the valve block is preferably formed as a cooling surface of an electronic component eliminating dissipated heat. The component can then be attached to this surface in a positively engaging manner. Especially, if the electronic controller is designed as a hybrid component, it is necessary to eliminate the dissipated heat of the power components (e.g. the components for driving the solenoids of the control valves) from the housing. This can be achieved in a particularly simply manner with the arrangement proposed by the invention.

If the wall of the housing is secured to the pump motor and/or the valve block by means of a dampening chamber plug a very efficient assembly is achieved because a separate attachment of the wall of the housing and thus the entire housing can be omitted.

In addition to or instead of securing the wall of the housing by means of the dampening chamber plug the wall of the housing can also be attached to the pump motor and/or the valve block by means of holding brackets. The holding brackets can be so designed that a holding edge is provided at the valve block and/or the pump motor for a positive engagement of the holding bracket. Several arms are preferably formed (integrally) or as separate parts on the support plate, each of which has a claw at its free end for attachment to the valve block and/or the pump motor. This is also advantageous in that the individual parts of the valves are secured in the valve block by the wall of the housing.

The housing of the electronic controller is preferably made from an impact and temperature resistant plastic material. The wall of the housing can be positively or integrally connected with the housing in order to achieve a dust-tight and/or hermetic seal. This positive or integral connection can be achieved either by a corresponding engagement of the wall of the housing with the remaining housing, or by bonding, sealing or potting of the wall of the housing with the remaining housing.

In order to achieve a total arrangement as impact resistant and unsusceptible to vibrations as possible, it is advantageous to completely fill the interior of the housing with an electrically insulating elastic mass.

A connector for connecting the electronic controller with the pump motor is preferably provided to be penetrating an opening in the wall, with the wall being divided in two areas by the opening. This results in two (nearly) completely isolated areas under the aspect of mechanical vibrations, which is of importance for the function of the wall as a heat sink for electronic components. Due to the fact that the attachment of the wall of the housing is effected via the dampening chamber plug at the valve block in the one area of the wall, the other area is essentially free from mechanical vibrations, e.g. caused by the switching cycles of the valves in the valve block. This vibration free area can therefore be optimally employed as a heat sink. Bending stresses as they occur in the one area from the bearing of the valve means against the wall of the housing cannot be transferred to the other area of the wall. This also prevents the electronic components attached to this area of the wall from becoming damaged. Moreover, the inner surface formed as a cooling surface of an electronic component emitting dissipated heat is so divided that each individual component attached thereon is located in only one area.

Figure 2:
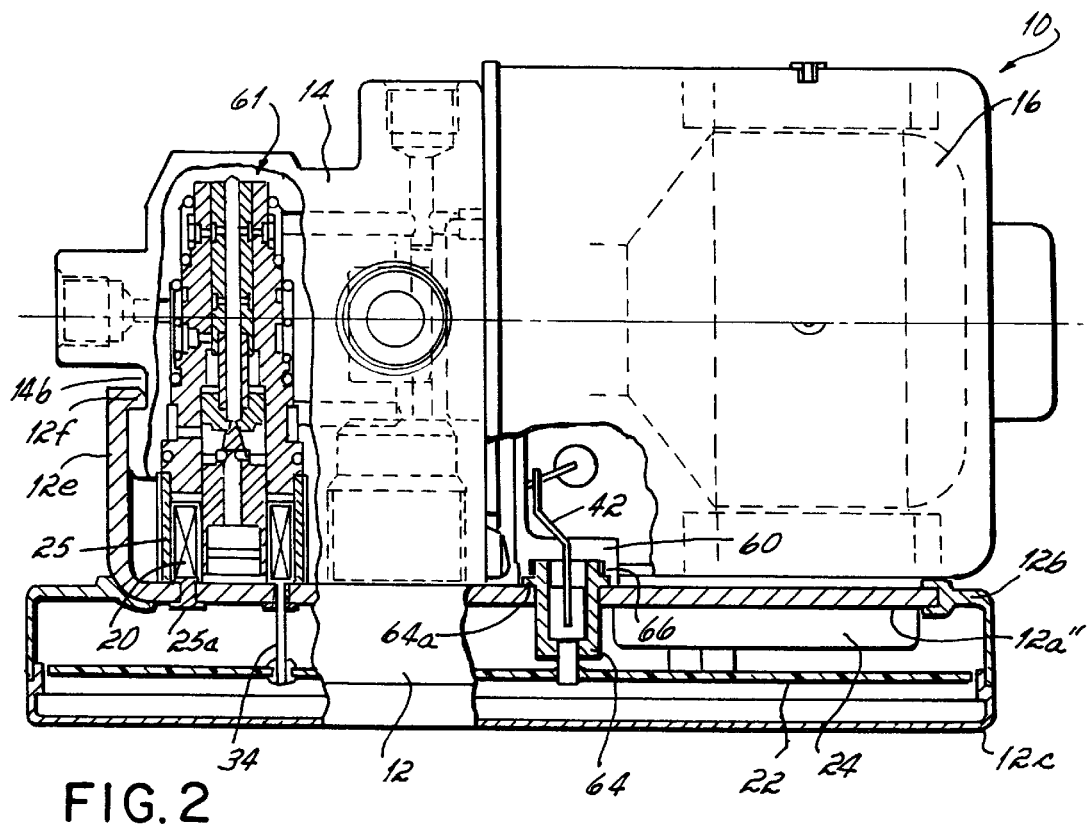

In the following, an embodiment of the invention will be described in mote detail with reference to the drawing, in which:

FIG. 1 shows a schematic, partially sectional, side view of the assemblies of interest of a block-protected braking system;

FIG. 2 a plan view of a second embodiment of a mounting of the housing at the valve block, partially sectioned;

FIG. 3 a side view of an embodiment for mounting the housing at the pump motor by means of a dampening chamber plug in an enlarged schematic, partially sectional side view; and FIG. 4 a plan view of a third embodiment of a mounting of the housing at the valve block, partially sectioned.

FIG. 1 shows a unit 10 with the following assemblies of a block-protected braking system:

An electronic controller of the braking system accommodated in a housing 12, with the electronic controller indicated here by a printed circuit board 22 and symbolically by a circuit element 24 only; a valve block 14 which accommodates the solenoid valves 14a required for a block-protected braking system (if required, with ASC) and associated line parts (which are connected with the individual wheel brakes of the vehicle—not shown); and a pump motor 16 which drives a pump which delivers hydraulic fluid in a manner known per se to the master cylinder and/or the wheel brakes (not shown).

The housing 12 is formed by a wall 12a facing the valve block 14 and the pump motor 16, an upper edge 12b surrounding the wall 12a and a lower shell 12c. The wall 12a with an outer surface 12a' facing the valve block 14 and the pump motor 16 is arranged so as to be in intimate contact with the valve block 14 or the pump motor 16, respectively. The wall 12a consists of a material with high heat conductivity, e.g. aluminium, and has several break-throughs for connecting lines 34 or connectors 64, respectively. An inner surface 12a" of the wall 12a is formed as a contact surface for a (hybrid) component 24 for which the wall 12a serves as a heat sink. The wall 12a of the housing 12 carries at its outer surface 12a' solenoids 20 for the electromagnetic valves 14a in the valve block 14. These solenoids 20 together with the wall 12a which serves as a support plate for the solenoids 20 are potted by means of an electrically insulating potting compound 25 to form a sub-assembly that can be handled independently. In order to additionally stabilize the solenoids with respect to the wall 12a, it is possible to secure the solenoids 20 by means of adhesive plugs 25a which project through break throughs in the wall 12a.

The connector 64 also projects through the wall 12a in the area of the pump motor 16 and makes contact with the electrical connections of the pump motor 16 via a contact terminal 26 and a line 42. At the outer surface 12a' of the wall 12a, the connector 64 has a circumferential web 64a which secures a seal 66 in order to keep off ambient influences form the interior of the housing 12.

FIG. 2 shows another embodiment of the housing 12 or its mounting, respectively, at the valve block 14 and the pump motor 16. As can be seen from FIG. 2, the wall 12a has an angled claw 12e perpendicular to the plane of the wall 12a, which at its free end has an extension 12f for engagement in a corresponding recess 14b in the valve block 14, and thus clamps the housing 12 against the valve block 14 or the pump motor 16, respectively.

FIG. 3 shows the cross section through an expansion chamber 96 and a dampening chamber 98 with a dampening chamber plug 88 inserted therein. The wall 12a is securely tightened against the valve block 14 by means of the dampening chamber plug 88. The additional fastening of the housing 12 at the valve block 14 by means of the claw 12e in the recess 14a provides a particularly safe mechanical mounting of the housing 12 at the valve block 14 which is unsusceptible to vibration.

As shown in FIG. 1, the connector 64 which connects the electronic controller 22, 24 with the pump motor 16 projects in such a manner through an opening 65 in the wall 12a of the housing 12 that the wall 12a is divided in two areas 13a, 13b by the opening 65. This divides the inner surface 12a" of the wall 12a of the housing 12 which is designed as a cooling surface of an electronic component 24 emitting dissipated heat in such a manner that the individual components attached thereon are arranged in only one of the two areas 13a, 13b (in FIG. 2 at the right).

The arrangements shown in FIGS. 1 and 2 also enable a simpler assembly in that the valve arrangement 14a in the valve block 14 can simply be introduced in the corresponding recess and subsequently, by fastening the wall 12a with the solenoids 20 potted therewith, is completely located mechanically. This most simple arrangement which both saves components and assembly time is advantageous in that several functions are assigned to individual components. On the one hand, the wall 12a, for example, serves as a wall of the housing 12 and on the other hand as a heat sink for the electronic component 24. The wall 12a together with the solenoids 20 also forms a preassembled construction unit which can be handled independently and which can be screwed to (via the dampening chamber plug 88) or engaged with (via the claw 12e and the recess 14b) the valve block 14, thereby also providing for the correct assembly and mounting of the valve arrangement 14a in the valve block 14.

The third embodiment shown in FIG. 4 differs from the embodiments of FIGS. 1 and 2 primarily in that a sleeve 100 of a valve assembly 61 is omitted so that a valve element 101 is movably accommodated in a hole 102 of the valve block 14. On the one hand, this results in the advantage of cost saving because of the omission of components, and on the other hand of a more compact design of the valve block 14 so that installation space can be saved. In addition, the number of ring-shaped seals is reduced with this embodiment which also contributes to cost saving.

In the embodiment according to FIG. 4, other than that of FIG. 2, the angled area of the wall 12a is fastened to the valve block 14 by means of a screw element 103 so that the recess 14a in the valve block 14 as well as the claw 12e of the wall 12a can be omitted. It is also possible to use the screw element 103 as a fastening/securing means as well in order to secure the unit 10 in the vehicle.

It is applicable to each of the three embodiments that the solenoids 20 of the valve assembly 61 are accommodated in a cylindrical housing element 105 which can be made as a simple formed sheet metal part. Moreover, for all the three embodiments a tolerance compensation between the solenoids 20 carried by the wall 12a and the cylindrical housing element 105 of the valve assembly 61 is not necessary because the valve assembly 61 bears hydraulically against the wall 12a via the cylindrical housing element 102. This enables the omission of flexible connecting means. In addition, in all the three embodiments the magnetic circuit which is built up for the current supply of the solenoids 20 for activating the valve assembly 61 extends over the cylindrical housing element 105 and the wall 12a. Alternatively or additionally to the opening in the wall 12a which serves to divide the wall 12a into two mechanically isolated areas, all the three embodiments can finally be provided with a relief groove or a notch in the dividing line.

We claim:

1. A hydraulic power unit for a block-protected vehicle braking system, comprising:
    an electronic controller (22, 24) arranged in a housing (12);
    a valve block (14) for accommodating electromagnetic solenoid valves for the control of hydraulic fluid in the braking system; and
    a pump motor (16) for a pump delivering hydraulic fluid, with the housing (12) of the controller (22, 24) being connected with the valve block (14) and the pump motor (16), characterized in that
    a wall (12a) of the housing (12) having an outer surface (12a') facing the valve block (14) which carries at least one solenoid (20) for the electromagnetic solenoid valves in the valve block (14) so that the wall (12a) of the housing (12) together with the at least one solenoid (20) forms a sub-assembly which can be handled independently and which can be secured to the valve block (14) directly with the outer surface (12a') of the wall (12a) in direct contact with the valve block (14).

2. A hydraulic power unit for a vehicle braking system according to claim 1, characterized in that the solenoids (20) for the electromagnetic solenoid valves are joined with the wall (12a) of the housing (12) by means of an electrically insulation material (25).

3. A hydraulic power unit for a vehicle braking system according to claim 1, characterized in that the wall (12a) of the housing (12) with the solenoids (20) and electrical connections (34) are potted to form one unit.

4. A hydraulic power unit for a vehicle braking system according to claim 3, characterized in that the electrical connections (34) penetrate the wall (12a) of the housing (12).

5. A hydraulic power unit for a vehicle braking system according to claim 4, characterized in that the wall (12a) of the housing (12) is made from a material with high heat conductivity.

6. A hydraulic power unit for a vehicle braking system according to claim 5, characterized in that the wall (12a) of the housing (12) with its inner surface (12a") facing away from the valve block (14) is formed as a cooling surface of an electronic component (24) emitting dissipated heat.

7. A hydraulic power unit for a vehicle braking system according to claim 1, characterized in that the interior of the housing (12) is completely filled with an electrically insulating.

8. A hydraulic power unit for a vehicle braking system according to claim 1, characterized in that the wall (12a) of the housing (12) is secured to the pump motor (16) and/or the valve block (14) by means of holding brackets (12e, 12f).

9. A hydraulic power unit for a vehicle braking system according to claim 1, characterized in that the housing (12) is made at least partially from a preferably impact and temperature resistant plastic material.

10. A hydraulic power unit for a vehicle braking system according to claim 1, characterized in that the housing (12) is connected with the wall (12a) of the housing (12) in a positive and integral manner.

11. A hydraulic power unit for a block-protected vehicle braking system, comprising
    an electronic controller (22, 24) arranged in a housing (12);
    a valve block (14) for accommodating electromagnetic solenoid valves for the control of hydraulic fluid in the braking system; and
    a pump motor (16) for a pump delivering hydraulic fluid, with the housing (12) of the controller (22, 24) being connected with the valve block (14) and the pump motor (16), characterized in that
    a wall (12a) of the housing (12) at its outer surface (12a') facing the valve block (14) carries at least one solenoid (20) for the electromagnetic solenoid valves in the valve block (14) so that the wall (12a) of the housing (12) together with the at least one solenoid (20) forms a sub-assembly which can be handled independently and which can be secured to the valve block (14) directly, and further characterized in that the wall (12a) of the housing (12) is secured to the pump motor (16) and/or the valve block (14) by means of a dampening chamber plug (88).

12. A hydraulic power unit for a block-protected vehicle braking system, comprising an electronic controller (22, 24) arranged in a housing (12);

a valve block (14) for accommodating electromagnetic solenoid valves for the control of hydraulic fluid in the braking system; and a pump motor (16) for a pump delivering hydraulic fluid, with the housing (12) of the controller (22, 24) being connected with the valve block (14) and the pump motor (16), characterized in that a wall (12a) of the housing (12) at its outer surface (12a') facing the valve block (14) carries at least one solenoid (20) for the electromagnetic solenoid valves in the valve block (14) so that the wall (12a) of the housing (12) together with the at least one solenoid (20) forms a sub-assembly which can be handled independently and which can be secured to the valve block (14) directly, and further characterized in that a connector (64) which connects the electronic controller (22, 24) with the pump motor (16) projects through an opening (65) in the wall (12a) of the housing (12), said wall (12a) being divided by the opening (65) in two areas (13a, 13b).

13. A hydraulic power unit for a block-protected vehicle braking system, comprising an electronic controller (22, 24) arranged in a housing (12);

a valve block (14) for accommodating electromagnetic solenoid valves for the control of hydraulic fluid in the braking system; and a pump motor (16) for a pump delivering hydraulic fluid, with the housing (12) of the controller (22, 24) being connected with the valve block (14) and the pump motor (16), characterized in that a wall (12a) of the housing (12) at its outer surface (12a') facing the valve block (14) carries at least one solenoid (20) for the electromagnetic solenoid valves in the valve block (14) so that the wall (12a) of the housing (12) together with the at least one solenoid (20) forms a sub-assembly which can be handled independently and which can be secured to the valve block (14) directly, and further characterized in that a connector (64) which connects the electronic controller (22, 24) with the pump motor (16) projects through an opening (65) in the wall (12a) of the housing (12), said wall (12a) being divided by the opening (65) in two areas (13a, 13b); and the wall (12a) of the housing (12) with its inner surface (12a') facing away from the valve block (14) is formed as a cooling surface of an electronic component (24) emitting dissipated heat and is divided in such a manner that individual components attached thereon are located in only one of the two areas (13a, 13b).

* * * * *